United States Patent
Mukai et al.

(10) Patent No.: US 9,644,937 B2
(45) Date of Patent: May 9, 2017

(54) PIPING LENGTH MEASURING SYSTEM AND PIPING LENGTH CALCULATING APPARATUS

(75) Inventors: Takuya Mukai, Tokyo (JP); Toshiyasu Higuma, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 895 days.

(21) Appl. No.: 13/980,948

(22) PCT Filed: Jan. 24, 2011

(86) PCT No.: PCT/JP2011/051241
§ 371 (c)(1),
(2), (4) Date: Jul. 22, 2013

(87) PCT Pub. No.: WO2012/101744
PCT Pub. Date: Aug. 2, 2012

(65) Prior Publication Data
US 2013/0297253 A1    Nov. 7, 2013

(51) Int. Cl.
*G01B 5/02* (2006.01)
*G01B 7/02* (2006.01)
(Continued)

(52) U.S. Cl.
CPC .......... *G01B 7/02* (2013.01); *F24F 1/26* (2013.01); *G01B 7/042* (2013.01)

(58) Field of Classification Search
USPC ........................................................ 702/158
See application file for complete search history.

(56) References Cited

U.S. PATENT DOCUMENTS

| 6,307,380 B1 | 10/2001 | Hirai et al. |
| 2010/0063772 A1* | 3/2010 | Kim .......... G01B 7/02 |
| | | 702/159 |

(Continued)

FOREIGN PATENT DOCUMENTS

| GB | 2154742 A | 9/1985 |
| JP | 04-134274 A | 5/1992 |
| JP | 07-294233 A | 11/1995 |

(Continued)

OTHER PUBLICATIONS

International Search Report of the International Searching Authority mailed May 10, 2011 for the corresponding international application No. PCT/JP2011/051241 (with English translation).

(Continued)

*Primary Examiner* — Paul D Lee
(74) *Attorney, Agent, or Firm* — Posz Law Group, PLC (57) ABSTRACT

A frequency characteristics measurer is disposed in the vicinity of an end of refrigerant piping, the end of which is connected to an outdoor unit, that connects the outdoor unit and an indoor unit of an air conditioner, and measures frequency characteristics of the refrigerant piping. A filter is attached at a position between the outdoor unit and a position where a terminal of the frequency characteristics measurer is connected, so as to wrap the refrigerant piping. A piping length calculator is connected to the frequency characteristics measurer via an interface cable, and acquires, via the interface cable, frequency characteristics measured by means of the frequency characteristics measurer. The piping length calculator extracts a lowest anti-resonant frequency from the acquired frequency characteristics, and calculates the length of the refrigerant piping on the basis of the extracted lowest anti-resonant frequency.

13 Claims, 8 Drawing Sheets

(51) Int. Cl.
F24F 1/26 (2011.01)
G01B 7/04 (2006.01)

(56) References Cited

U.S. PATENT DOCUMENTS

| | | | |
|---|---|---|---|
| 2011/0072833 A1* | 3/2011 | Koyama | F25B 31/006 62/3.1 |
| 2011/0096950 A1* | 4/2011 | Rougas | H04R 1/20 381/338 |
| 2011/0219798 A1* | 9/2011 | Kim | F24F 1/0003 62/129 |
| 2013/0134991 A1* | 5/2013 | Higuma | G01B 7/02 324/635 |

FOREIGN PATENT DOCUMENTS

| | | |
|---|---|---|
| JP | 2000-131004 A | 5/2000 |
| JP | 2003-248027 A | 9/2003 |
| JP | 2007-085892 A | 4/2007 |
| JP | 2010-256224 A | 11/2010 |

OTHER PUBLICATIONS

Notification of Reasons for Rejection mailed Nov. 8, 2011 in corresponding JP patent application No. 2009-257411 (and English translation).
Office Action mailed May 6, 2015 in the corresponding CN application No. 201180065828.X (with English translation).
Extended European Search Report dated Jan. 2, 2017 in the corresponding EP application No. 11857297.3.

* cited by examiner

| ANTI-RESONANT FREQUENCY fn[MHz] | 0.51 | 0.96 | 1.54 | 2.17 | 2.53 | 3.52 | 4.09 | 4.63 |
|---|---|---|---|---|---|---|---|---|
| LENGTH Ln[m] | 294.1 | 156.3 | 97.4 | 69.1 | 59.3 | 42.6 | 36.7 | 32.4 |

FIG.10

|  | LOWEST ANTI-RESONANT FREQUENCY | HARMONIC COMPONENT | | HARMONIC COMPONENT | |
|---|---|---|---|---|---|

| ANTI-RESONANT FREQUENCY fn[MHz] | 0.51 | 0.96 | 1.54 | 2.17 | 2.53 | 3.52 | 4.09 | 4.63 |
|---|---|---|---|---|---|---|---|---|
| LENGTH Ln[m] | 294.1 | 156.3 | 97.4 | 69.1 | 59.3 | 42.6 | 36.7 | 32.4 |

TOTAL LENGTH OF REFRIGERANT PIPING = 156.3 + 69.1+ 42.6 = 268 [m]

FIG.11

| ANTI-RESONANT FREQUENCY fn [MHz] | 0.51 | 0.96 | 1.54 | 2.17 | 2.53 | 3.52 | 4.09 | 4.63 |
|---|---|---|---|---|---|---|---|---|
| LENGTH Ln [m] | 294.1 | 156.3 | 97.4 | 69.1 | 59.3 | 42.6 | 36.7 | 32.4 |
| HARMONIC DETERMINATION LIMIT [MHz] (ANTI-RESONANT FREQUENCY + 1%) | 0.5049 | 0.9504 | 1.5246 | 2.1483 | 2.5047 | 3.4848 | 4.0491 | 4.5837 |
| HARMONIC DETERMINATION LIMIT [MHz] (ANTI-RESONANT FREQUENCY − 1%) | 0.5151 | 0.9696 | 1.5554 | 2.1917 | 2.5553 | 3.5552 | 4.1309 | 4.6763 |
| ANTI-RESONANT FREQUENCY × 2 [MHz] | 1.02 | 1.92 | 3.08 | 4.34 | 5.06 | 7.04 | 8.18 | 9.26 |
| ANTI-RESONANT FREQUENCY × 3 [MHz] | 1.53 | 2.88 | 4.62 | 6.51 | 7.59 | 10.56 | 12.27 | 13.89 |
| ANTI-RESONANT FREQUENCY × 4 [MHz] | 2.04 | 3.84 | 6.16 | 8.68 | 10.12 | 14.08 | 16.36 | 18.52 |
| ANTI-RESONANT FREQUENCY × 5 [MHz] | 2.55 | 4.8 | 7.7 | 10.85 | 12.65 | 17.6 | 20.45 | 23.15 |
| ANTI-RESONANT FREQUENCY × 6 [MHz] | 3.06 | 5.76 | 9.24 | 13.02 | 15.18 | 21.12 | 24.54 | 27.78 |
| ANTI-RESONANT FREQUENCY × 7 [MHz] | 3.57 | 6.72 | 10.78 | 15.19 | 17.71 | 24.64 | 28.63 | 32.41 |
| ANTI-RESONANT FREQUENCY × 8 [MHz] | 4.08 | 7.68 | 12.32 | 17.36 | 20.24 | 28.16 | 32.72 | 37.04 |
| ANTI-RESONANT FREQUENCY × 9 [MHz] | 4.59 | 8.64 | 13.86 | 19.53 | 22.77 | 31.68 | 36.81 | 41.67 |
| HARMONIC DETERMINATION | — | — | 3RD HARMONIC OF 0.51 [MHz] | — | 5TH HARMONIC OF 0.51 [MHz] | — | 8TH HARMONIC OF 0.51 [MHz] | 3RD HARMONIC OF 1.54 [MHz] |

FIG.12

PIPING LENGTH MEASURING SYSTEM AND PIPING LENGTH CALCULATING APPARATUS

CROSS REFERENCE TO RELATED APPLICATION

This application is a U.S. national stage application of the International Patent Application No. PCT/JP2011/051241 filed on Jan. 24, 2011.

TECHNICAL FIELD

The present invention relates to technology that measures the length of piping, and more particularly, relates to technology that measures the length of refrigerant piping in an air conditioner.

BACKGROUND ART

For example, when replacing an air conditioner installed in a building or the like with another model, it is typical to replace only a refrigerant and reuse an existing refrigerant piping between an outdoor unit and an indoor unit as-is for reasons such as cutting costs. In this case, if the amount of replaced refrigerant is greater or less than the correct amount, there is a risk of falling into an uncooled state in which the required cooling capacity is no longer ensured. Consequently, when replacing a refrigerant, it is necessary to fill in a suitable amount of the refrigerant according to the length of the refrigerant piping (refrigerant piping length).

However, the refrigerant piping is sometimes laid out in a different arrangement than design specifications due to construction problems or other issues, and there is no guarantee that the actual refrigerant piping length necessarily matches the values stated in the design specifications.

Accordingly, Patent Literature 1, for example, proposes technology that attaches a transmitter, which imparts vibrations to refrigerant piping, and multiple receivers, which detect the vibrations, at given positions along the refrigerant piping, measures the length of each segment from the propagation time by which each receiver detects the vibrations imparted by the transmitter, and computes the refrigerant piping length on the basis of a given algorithm.

CITATION LIST

Patent Literature

Patent Literature 1: Unexamined Japanese Patent Application Kokai Publication No. 2007-85892

SUMMARY OF INVENTION

Technical Problem

However, in order to precisely measure the refrigerant piping length with the above technology, it is necessary to dispose a measuring device such as a transmitter or receiver at each end of the refrigerant piping. For this reason, measuring devices cannot be easily attached to refrigerant piping with many branches or the like, and much time is required before starting measurement. Also, if for some reason, the refrigerant piping is not disposed according to the design specifications, deciding which indoor unit corresponds to which end of the refrigerant piping becomes difficult, and the installation of measuring devices is expected to be taken even more time and labor.

Furthermore, measuring devices cannot be attached next to the indoor units in some situations, such as buildings where permission to enter indoors cannot be obtained due to security issues.

The present invention is devised in light of such circumstances, and an objective thereof is to provide a piping length measuring system and a piping length calculating apparatus with a simplified setup for accurately measuring the refrigerant piping length.

Solution to Problem

In order to achieve the above objective, a piping length measuring system according to the present invention comprises frequency characteristics measuring means that is disposed in the vicinity of one end of refrigerant piping connecting an outdoor unit and an indoor unit of an air conditioner, and measures frequency characteristics of the refrigerant piping, a filter that is attached between a measuring site on the refrigerant piping measured by the frequency characteristics measuring means and the outdoor unit or the indoor unit that is the nearest the measuring site, and prevents a test signal from flowing into the outdoor unit or the indoor unit during the measuring, and piping length calculating means that extracts a lowest anti-resonant frequency from the frequency characteristics measured by the frequency characteristics measuring means, and calculates a length of the refrigerant piping on the basis of the extracted lowest anti-resonant frequency.

Also, a piping length calculating apparatus according to another aspect of the present invention extracts a plurality of anti-resonant frequencies under a given condition from the frequency characteristics of refrigerant piping connecting an outdoor unit and one or a plurality of indoor units of an air conditioner, determines whether or not a branching exists in the refrigerant piping on the basis of the extracted plurality of anti-resonant frequencies, and in the case of determining that the branching does not exist, calculates a length of the refrigerant piping on the basis of a lowest anti-resonant frequency from among the extracted plurality of anti-resonant frequencies, in the case of determining that the branching does exist, selects all anti-resonant frequencies that are not the lowest anti-resonant frequency and do not correspond to harmonic components from among the extracted plurality of anti-resonant frequencies, and calculates a length of the refrigerant piping on the basis of all of the selected anti-resonant frequencies.

Advantageous Effects of Invention

According to the present invention, the setup for accurately measuring the refrigerant piping length becomes simpler, thus potentially greatly saving work effort and shortening the measuring time.

DESCRIPTION OF EMBODIMENTS

Hereinafter, embodiments of the present invention will be described in detail with reference to the drawings.

(Embodiment 1)

Figure 1:
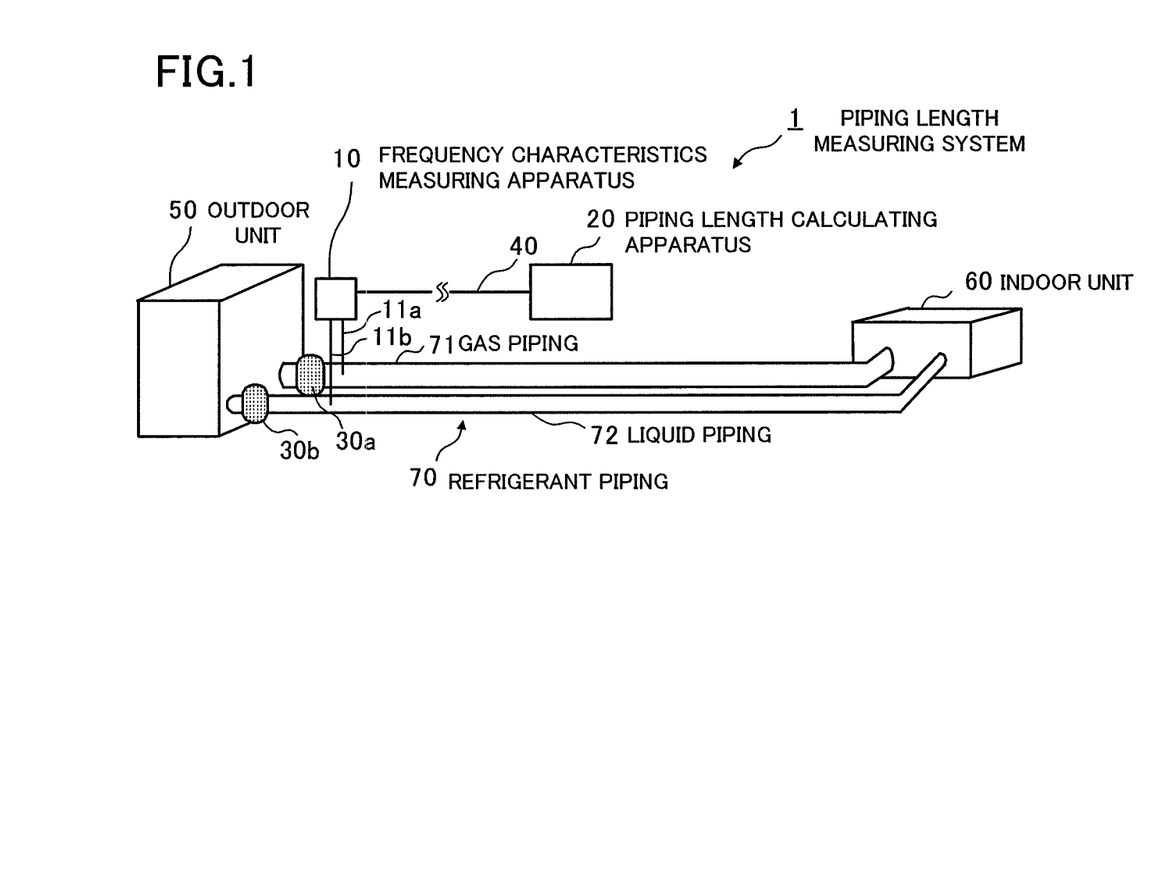
FIG. 1 is a diagram illustrating an overall configuration of a piping length measuring system according to Embodiment 1 of the present invention.

FIG. 1 is a schematic diagram illustrating an overall configuration of a piping length measuring system 1 according to Embodiment 1 of the present invention. As illustrated in FIG. 1, the piping length measuring system 1 comprises a frequency characteristics measuring apparatus 10, a piping length calculating apparatus 20, and filters 30a and 30b. The frequency characteristics measuring apparatus 10 and the piping length calculating apparatus 20 are connected to each other via an interface cable 40 such as a serial cable.

The air conditioner illustrated in FIG. 1 comprises one outdoor unit 50 and one indoor unit 60. Similarly to a typical air conditioner, the air conditioner performs air conditioning operations by circulating a refrigerant inside refrigerant piping 70 between the outdoor unit 50 and the indoor unit 60. The refrigerant piping 70 comprises gas piping 71 and liquid piping 72, each made of metal.

The frequency characteristics measuring apparatus 10 is an apparatus that measures the frequency characteristics of the refrigerant piping 70, and is equipped with network analyzer functionality. The frequency characteristics measuring apparatus 10 is installed in the vicinity of the outdoor unit 50, with one terminal 11a connected near an end of the gas piping 71, the end of which is connected to the outdoor unit 50, and the other terminal 11b connected near an end of the liquid piping 72, the end of which is connected to the outdoor unit 50.

The frequency characteristics measuring apparatus 10 outputs a test signal at a given frequency towards the refrigerant piping 70, and simultaneously measures a signal level on the refrigerant piping 70. The frequency characteristics measuring apparatus 10 then obtains a gain value given as the ratio of the signal level of the test signal to the measured signal level, and saves the obtained gain value in a built-in buffer (not illustrated). The frequency characteristics measuring apparatus 10 conducts similar processing while continuously varying the frequency of the test signal in a given range. The gain value for each frequency is then transmitted to the piping length calculating apparatus 20 via the interface cable 40 as frequency characteristics data for the refrigerant piping 70. For example, the frequency characteristics measuring apparatus 10 may be configured to measure S11 of an S parameter, and use that parameter value to obtain frequency characteristics data.

The filters 30a and 30b are both comprised of ferrite cores, for example, and are respectively attached in a given mode at given positions on the gas piping 71 and the liquid piping 72. Specifically, the filter 30a is attached at a position between the outdoor unit 50 and a position where the terminal 11a of the frequency characteristics measuring apparatus 10 is connected, so as to wrap the gas piping 71. Similarly, the filter 30b is attached at a position between the outdoor unit 50 and a position where the terminal 11b of the frequency characteristics measuring apparatus 10 is connected, so as to wrap the liquid piping 72.

By attaching the filters 30a and 30b in the mode as described above, a sufficiently large impedance is granted to the refrigerant piping 70 with respect to the frequency of the test signal. As a result, the test signal is prevented from flowing into the outdoor unit 50, thereby making it possible to propagate the test signal along the refrigerant piping 70 between the outdoor unit 50 and the indoor unit 60.

Figure 2:
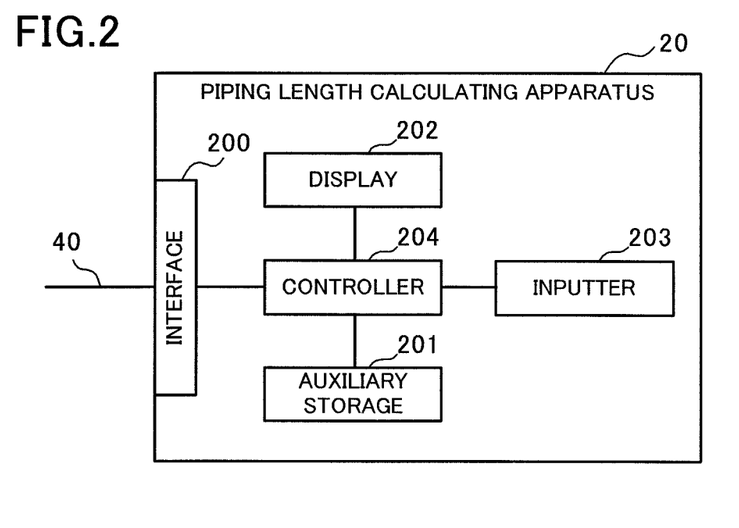
FIG. 2 is a block diagram illustrating a configuration of a piping length calculating apparatus in FIG. 1.

As illustrated in FIG. 2, the piping length calculating apparatus 20 is provided with an interface 200, auxiliary storage 201, a display 202, an inputter 203 and a controller 204.

The interface 200 has a communication interface device according to a standard such as RS-485 or RS-232C. The interface 200 follows instructions from the controller 204 and conducts serial communication with the frequency characteristics measuring apparatus 10 via the interface cable 40. The auxiliary storage 201 has readable and writable non-volatile semiconductor memory such as flash memory, or a hard disk, or the like. The auxiliary storage 201 stores information such as device drivers for controlling respective components, a program for executing piping length calculation processing discussed below (piping length calculating program), and frequency characteristics data sent from the frequency characteristics measuring apparatus 10.

The display 202 has a display device such as a CRT or liquid crystal display, and displays data such as characters and images supplied from the controller 204. The inputter 203 has an input device such as various switches and dials, a keyboard, a keypad, a touchpad, or a mouse. The inputter 203 receives operational input from a user, and delivers the received signal to the controller 204. Note that, the display 202 and the inputter 203 may be realized as a touch panel.

The controller 204 includes components such as a Central Processing Unit (CPU) and a primary storage device (neither illustrated). The controller 204 controls the interface 200, the auxiliary storage 201, the display 202 and the inputter 203, and accordingly exchanges data with these units. The controller 204 also executes the piping length calculation processing discussed below by following a piping length calculating program stored in the auxiliary storage 201.

Figure 3:
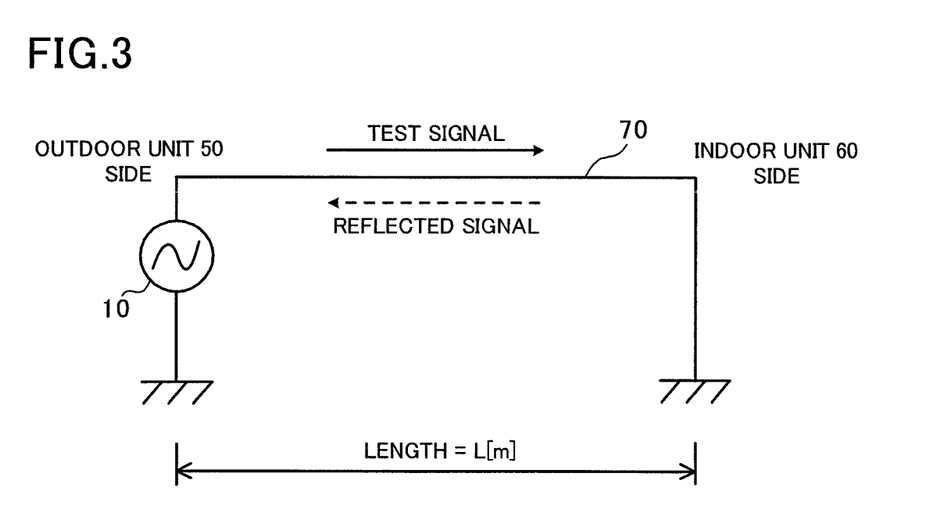
FIG. 3 is a diagram illustrating the configuration in FIG. 1 as an electrical equivalent circuit.

Next, the frequency characteristics of the refrigerant piping 70 illustrated in FIG. 1 will be described. The configuration illustrated in FIG. 1 is expressible as an electrical equivalent circuit as illustrated in FIG. 3. In this circuit, the frequency characteristics measuring apparatus 10 is treated as a signal source of alternating current, while the gas piping 71 and the liquid piping 72 are treated as a pair of leads with a length L (m). Also, the gas piping 71 and the liquid piping 72 are electrically shorted via the metal casing of the indoor unit 60.

In FIG. 3, a test signal is output from the frequency characteristics measuring apparatus 10 and propagates along the refrigerant piping 70 to reach an end of the refrigerant piping 70, the end of which is connected to the indoor unit 60. Since the gas piping 71 and the liquid piping 72 are electrically shorted at the indoor unit 60, a reflected signal of the test signal subjected to phase inversion propagates along the refrigerant piping 70 in the opposite direction. Consequently, the frequency characteristics measuring apparatus 10 measures the ratio of the combined signal combining the test signal and the reflected signal (gain value).

Where the length of the refrigerant piping 70 is expressed by L (m), while the wavelength $\lambda$ (m) of the test signal is expressed by L=$\lambda$/2 ($\lambda$, 3$\lambda$/2, . . . ), at a measuring position of the frequency characteristics measuring apparatus 10, signs in the signal levels of the test signal and the reflected signal are always inverted, and the signal level of the combined signal always becomes 0. Consequently, the gain value also becomes 0.

Figure 4:
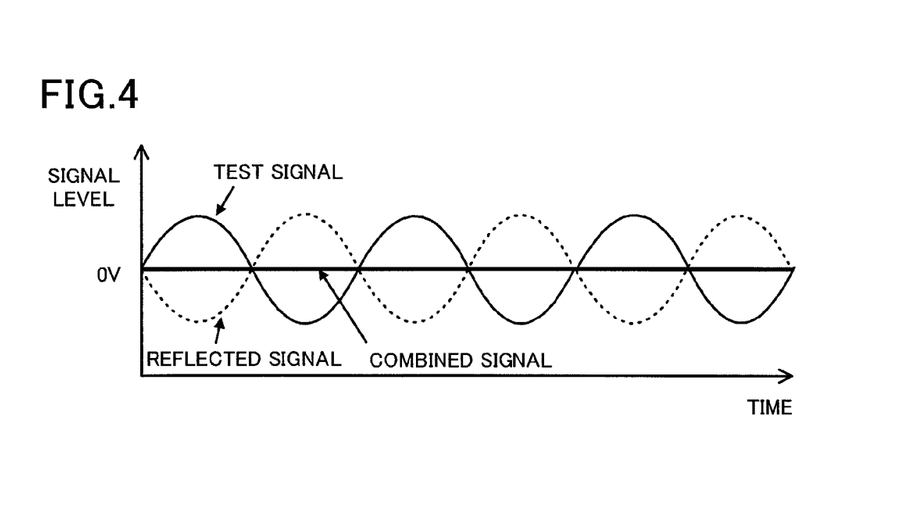
FIG. 4 is a diagram illustrating a signal waveform in the refrigerant piping in FIG. 1.

FIG. 4 illustrates time change in the test signal, the reflected signal, and the combined signal at the measuring position of the frequency characteristics measuring apparatus 10 in the refrigerant piping 70. In practice, the reflected signal attenuates due to factors such as a resistance component and an inductor component of the refrigerant piping 70, and thus the gain value does not become 0. However, the gain value still decreases significantly compared to frequencies where the wavelength $\lambda$ (m) of the test signal is other than the above.

A phenomenon in which the gain value decreases significantly in this way is called anti-resonance. Hereinafter, a test signal frequency where such anti-resonance occurs is referred to as an anti-resonant frequency. Herein, the wavelength $\lambda$ (m) of a test signal at a frequency f (Hz) is expressed by $\lambda$=c/f (where c is the electrical signal propagation speed at $300 \times 10^6$ (m/s)).

Figure 5:
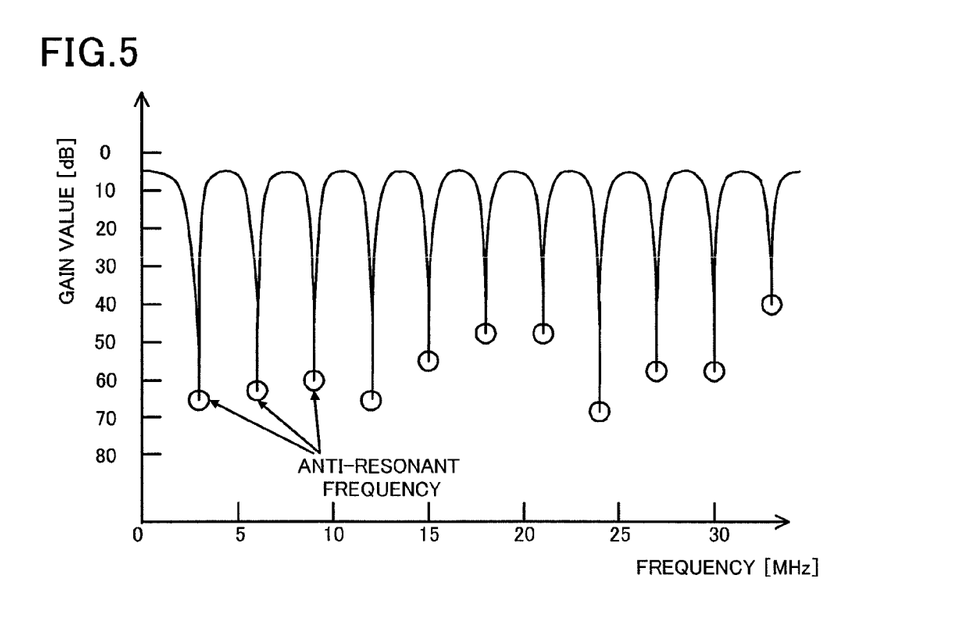
FIG. 5 is a diagram illustrating an example of frequency characteristics of the refrigerant piping in FIG. 1.

FIG. 5 is a diagram illustrating an example of the frequency characteristics of the refrigerant piping 70 measured by the frequency characteristics measuring apparatus 10. In this example, the length L of the refrigerant piping 70 is 50 (m). This example demonstrates that anti-resonance occurs at a frequency of approximately 3 MHz and the gain value decreases significantly. Anti-resonance also similarly occurs at the harmonic components of 6 MHz, 9 MHz, and the like. From these frequency characteristics results, the lowest anti-resonant frequency (lowest anti-resonant frequency) f0 (in this example, 3 MHz) is used to calculate the length L of the refrigerant piping 70.

In other words, the length L becomes L=$\lambda$0/2 (where $\lambda$0=c/f0)=50 (m).

Figure 6:
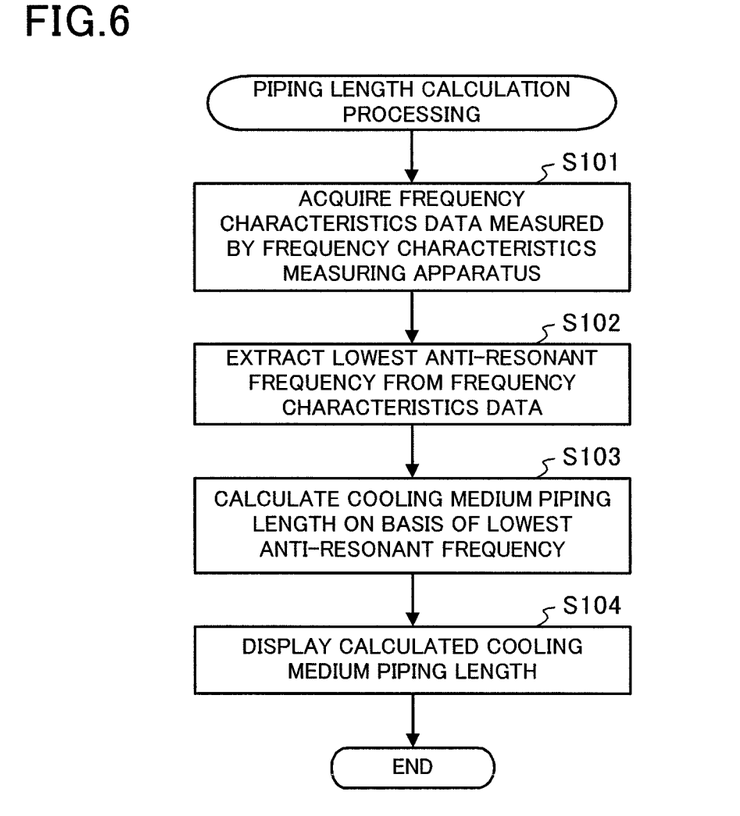
FIG. 6 is a flowchart illustrating a procedure of piping length calculation processing in Embodiment 1.

FIG. 6 is a flowchart illustrating a procedure of piping length calculation processing that the controller 204 of the piping length calculating apparatus 20 executes by following a piping length calculating program. The piping length calculation processing is started by a given user operation via the inputter 203.

First, the controller 204 reads and acquires frequency characteristics data measured by the frequency characteristics measuring apparatus 10 from the auxiliary storage 201 (step S101). The controller 204 extracts a lowest anti-resonant frequency from the acquired frequency characteristics data (step S102).

The controller 204 then calculates the length of the refrigerant piping 70 (refrigerant piping length) from the extracted lowest anti-resonant frequency and the above formula (step S103). The controller 204 displays the calculated refrigerant piping length via the display 202 (step S104).

As above, the piping length measuring system 1 in the present embodiment does not require installation of a measuring apparatus for measuring the frequency characteristics of the refrigerant piping near both ends of the refrigerant piping, and just requires installation of the measuring apparatus near one of the ends. For this reason, installation setup of the measuring apparatus (frequency characteristics measuring apparatus 10) is simple, thereby potentially greatly saving work effort and shortening the measuring time.

Also, since only sites near an end of refrigerant piping, the end of which is connected to the outdoor unit, are used as measuring points, measuring the refrigerant piping length becomes possible even in buildings where permission to enter indoors cannot be obtained due to security or other issues.

(Embodiment 2)

Figure 7:
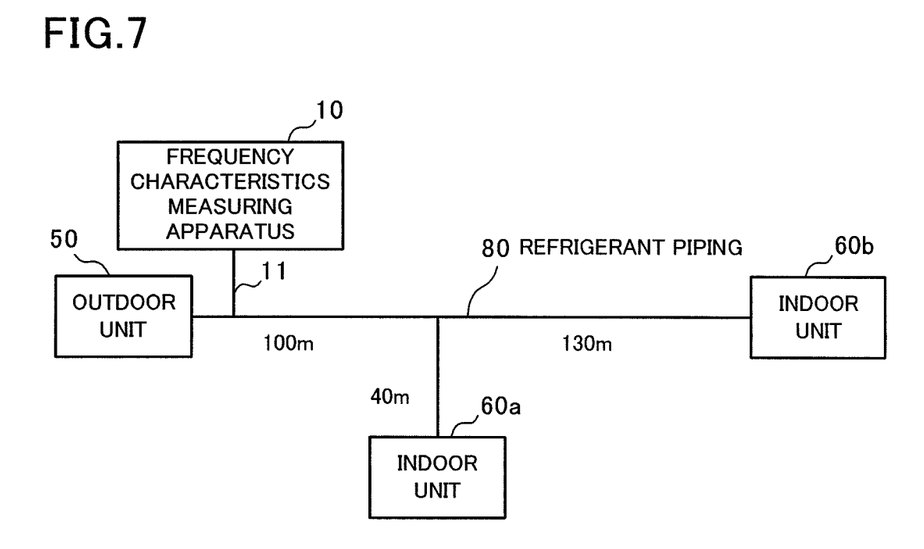
FIG. 7 is a schematic diagram illustrating an example of refrigerant piping with branching in Embodiment 2.

As discussed above, the length of refrigerant piping without branching is obtainable with the piping length calculation processing by the piping length measuring system 1 according to Embodiment 1. However, in a case where refrigerant piping 80 branches and connects to multiple indoor units (60a, 60b) as illustrated in FIG. 7, it is difficult to measure the length of the refrigerant piping 80 with the above piping length calculation processing. This is because the test signal output by the frequency characteristics measuring apparatus 10 is partially reflected at not only the respective shorted indoor units (60a, 60b) but also at the branching point, and in addition, because the occurance of anti-resonance is complicated since the respective branches have different lengths.

The piping length measuring system in the present embodiment adds a modification to the piping length calculation processing according to the piping length measuring system 1 in Embodiment 1 to enable length measurement even for refrigerant piping with branching. Hereinafter, the piping length calculation processing according to the piping length measuring system in the present embodiment will be described in detail. Note that, the piping length measuring system in the present embodiment has a similar configuration and functionality as the piping length measuring system 1 in Embodiment 1 in all respects other than the piping length calculation processing. Therefore, in the following description, description of the hardware configuration of the frequency characteristics measuring apparatus and the piping length calculating apparatus as well as the function of each component will be omitted by using the same reference signs as in Embodiment 1.

FIG. 7 shows a configuration such that the outdoor unit 50 and the indoor units 60a and 60b are connected to the refrigerant piping 80 with a total length of 270 m. Note that, in FIG. 7, the gas piping and the liquid piping are integrally represented as a single refrigerant piping 80. The frequency characteristics measuring apparatus 10 is installed in the vicinity of the outdoor unit 50, with the terminal 11 connected near an end of the refrigerant piping 80, the end of which is connected to the outdoor unit 50. Also, although not illustrated, as similar to Embodiment 1, a filter is comprised of a material such as a ferrite core is attached at a position between the outdoor unit 50 and a position where the terminal 11 of the frequency characteristics measuring apparatus 10 is connected, so as to wrap the refrigerant piping 80.

Figure 8:
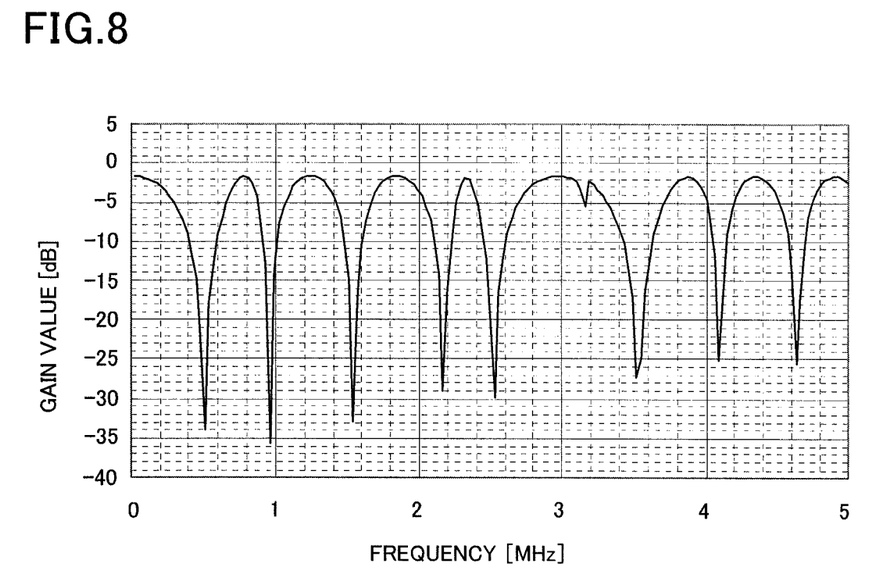
FIG. 8 is a diagram illustrating frequency characteristics of the refrigerant piping illustrated in FIG. 7.

FIG. 8 is a diagram illustrating frequency characteristics of the refrigerant piping 80 illustrated in FIG. 7 which are obtained by simulation with an electromagnetic field simulator. From the frequency characteristics, it is possible to confirm that anti-resonant frequencies other than the harmonic components are included, unlike the case of no branching.

Figure 9:
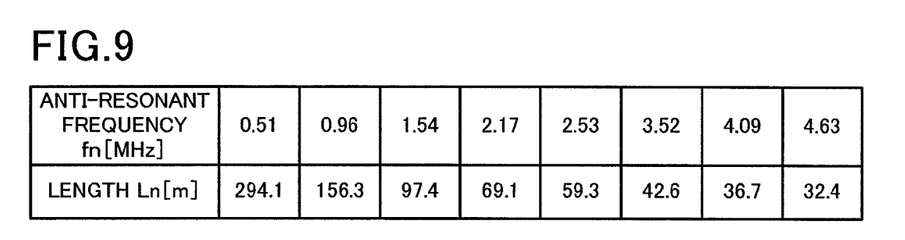
FIG. 9 is a table illustrating relationship between an anti-resonant frequency extracted from the frequency characteristics in FIG. 8, and the length corresponding to that anti-resonant frequency.

FIG. 9 is a table illustrating the relationship between an anti-resonant frequency fn extracted from the frequency characteristics in FIG. 8 and the length Ln obtained from the formula Ln=λn/2 (where λn=c/fn) (in other words, the formula for the case of no branching) using that anti-resonant frequency.

Figure 10:
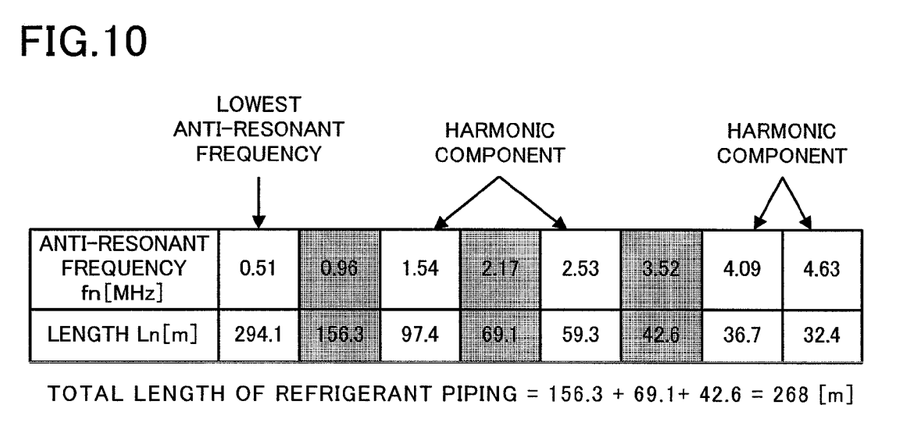
FIG. 10 is a diagram for explaining a refrigerant piping length calculating method for the case of branching in Embodiment 2.

FIG. 10 is a table highlighting, from among the data illustrated in FIG. 9, the lowest anti-resonant frequency, the anti-resonant frequencies fn excluding the harmonic components, and the lengths Ln corresponding to those anti-resonant frequencies fn. This table demonstrates that the sum total of the lengths Ln corresponding to the highlighted anti-resonant frequencies fn (156.3+69.1+42.6=268 (m)) approximates the total length of the refrigerant piping 80 (270 (m)).

Figure 11:
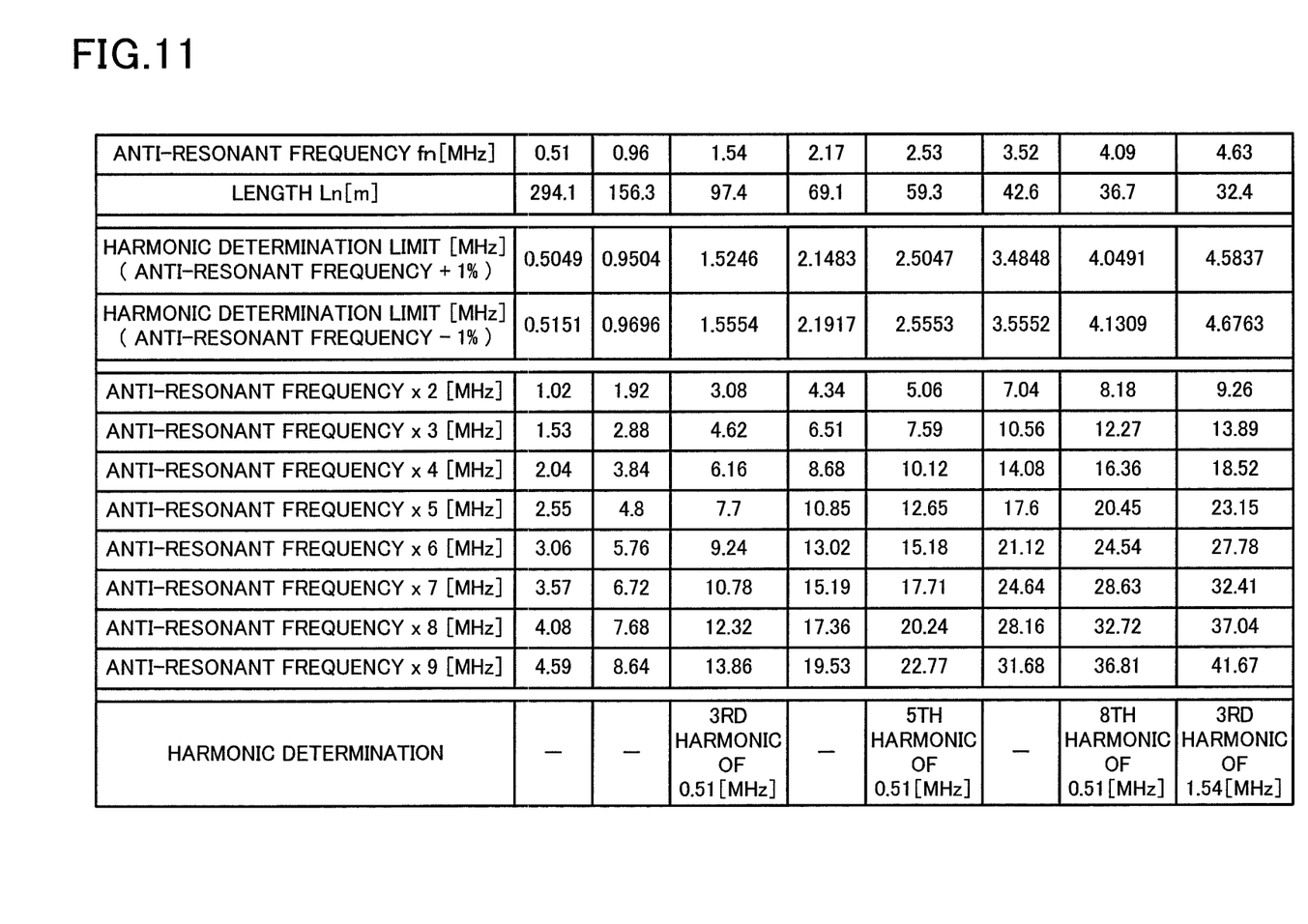
FIG. 11 is a diagram for explaining a technique of determining whether or not a measured anti-resonant frequency corresponds to a harmonic component in Embodiment 2.

The technique of determining whether or not a measured anti-resonant frequency corresponds to a harmonic component will now be described. The piping length calculating apparatus 20 in the present embodiment treats an anti-resonant frequency as a harmonic component in the case where a harmonic component of some other measured anti-resonant frequency is included within a harmonic determination bandwidth corresponding to the measured anti-resonant frequency. In this example, the harmonic determination bandwidth is set to ±1% of the measured anti-resonant frequency. In doing so, three of the measured anti-resonant frequencies in this example, 0.96 (MHz), 2.17 (MHz) and 3.52 (MHz), are selected as not corresponding to the harmonic component, as illustrated in FIG. 11.

Figure 12:
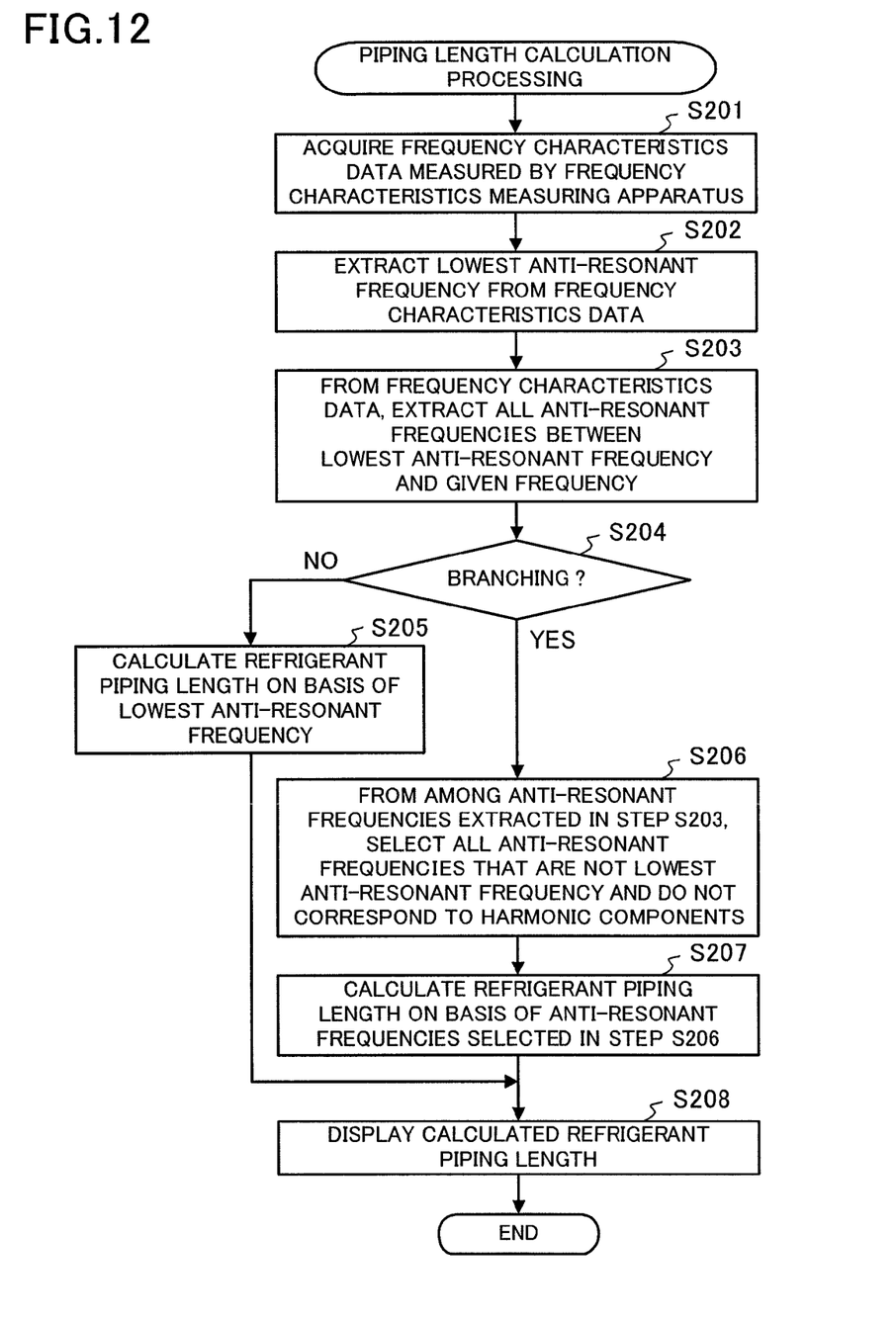
FIG. 12 is a flowchart illustrating a procedure of piping length calculation processing in Embodiment 2.

FIG. 12 is a flowchart illustrating a procedure of piping length calculation processing executed by the piping length calculating apparatus 20 in the present embodiment. The piping length calculation processing is started by a given user operation via the inputter 203.

First, the controller 204 reads and acquires frequency characteristics data measured by the frequency characteristics measuring apparatus 10 from the auxiliary storage 201 (step S201). The controller 204 then extracts a lowest anti-resonant frequency from the acquired frequency characteristics data, and stores the extracted lowest anti-resonant frequency in a buffer (not illustrated) (step S202).

In addition, the controller 204 extracts all anti-resonant frequencies existing between the lowest anti-resonant frequency and a given frequency from the acquired frequency characteristics data, and stores the extracted anti-resonant frequencies in the buffer (step S203). At this point, anti-resonant frequencies existing at frequencies up to 10 times the lowest anti-resonant frequency are targeted for extraction, for example.

The controller 204 determines whether or not branching exists in the refrigerant piping (step S204). At this point, the controller 204 determines that the branching does not exist in refrigerant piping in the case where all of the anti-resonant frequencies extracted in step S203 approximately correspond to integer multiple of the lowest anti-resonant frequency, or in other words, all of the anti-resonant frequencies except the lowest anti-resonant frequency correspond to harmonic components of the lowest anti-resonant frequency. In other cases, the controller 204 determines that branching does exist in the refrigerant piping.

In the case where the above determination result indicates no branching (step S204; No), the controller 204 calculates the length of the refrigerant piping (the refrigerant piping 70 in FIG. 1, for example) from the formula L (m)=λ0/2 (where λ0=c/f0) on the basis of the extracted lowest anti-resonant frequency (step S205).

On the other hand, in the case of branching (step S204; Yes), the controller 204 uses the technique discussed above to select all anti-resonant frequencies from among the anti-resonant frequencies extracted in step S203 which are not the lowest anti-resonant frequency and which do not correspond to the harmonic component (step S206). The controller 204 then calculates the length of the refrigerant piping (the refrigerant piping 80, for example) on the basis of the anti-resonant frequencies selected in step S206 (step S207). Specifically, the controller 204 obtains the length Ln according to the formula below for each anti-resonant frequency selected in step S206, and takes the sum total thereof as the length of the refrigerant piping.

$$Ln(m)=\lambda n/2 \text{ (where } \lambda n=c/fn)$$

The controller 204 then displays the calculated refrigerant piping length via the display 202 (step S208).

As described above, the piping length measuring system in the present embodiment exhibits operational advantages equivalent to the piping length measuring system 1 in Embodiment 1. In other words, a measuring apparatus for measuring the frequency characteristics of the refrigerant piping is not required to be installed near both ends of the refrigerant piping, and only has to be installed near one end. Therefore, installation setup of the measuring apparatus (frequency characteristics measuring apparatus 10) is simple, thereby potentially greatly saving work effort and shortening the measuring time.

Also, since only sites near an end of refrigerant piping, the end of which is connected to the outdoor unit, are used as measuring points, measuring the refrigerant piping length becomes possible even in buildings where permission to enter indoors cannot be obtained due to security or other issues.

Furthermore, in addition to the above operational advantages, the piping length measuring system in the present embodiment also exhibits a unique advantage of enabling length measurement even for refrigerant piping with branching.

However, the present invention is not limited to the foregoing embodiments, and various modification are obviously possible within a scope without departing from the spirit of the present invention.

For example, the measurement of the frequency characteristics of the refrigerant piping may be configured such that a command requesting to start measuring is transmitted from the piping length calculating apparatus 20 to the frequency characteristics measuring apparatus 10 by a user operation or other trigger, and the frequency characteristics measuring apparatus 10 starts measuring of the frequency characteristics when triggered by receiving such a command.

Also, although gain values for respective frequencies are treated as the frequency characteristics data of the refrigerant piping in the foregoing embodiments, peak values of the voltage in the refrigerant piping or effective values of the voltage in the refrigerant piping for respective frequencies may also be treated as the frequency characteristics data.

In addition, a communication interface between the frequency characteristics measuring apparatus 10 and the piping length calculating apparatus 20 is not limited, and frequency characteristics data may be handed over via an interface such as a USB interface or Ethernet (registered trademark) interface, for example.

The frequency characteristics data may also be handed over via a recording medium such as a flexible disk, USB memory, or a memory card such as an SD card.

Also, the measuring of frequency characteristics and the calculating of refrigerant piping length may be conducted by a single apparatus having the combined functionality of both the frequency characteristics measuring apparatus 10 and the piping length calculating apparatus 20.

Also, only sites near an end of the refrigerant piping, the end of which is connected to the indoor unit, rather than near an end of the refrigerant piping, the end of which is connected to outdoor unit, may be taken as the measuring points. Even in this case, the advantages is exhibited such that installation setup of the measuring apparatus (the frequency characteristics measuring apparatus 10) is simplified, thereby potentially greatly saving work effort and shortening the measuring time.

Furthermore, it is also possible to cause an existing Personal Computer (PC) or the like to function as the piping length calculating apparatus 20 in the foregoing embodiments by applying a program. In other words, the piping length calculating program executed by the controller 204 as discussed above may be installed in an existing PC or the like, and by executing such a piping length calculating program by a CPU or the like in the PC or the like, it becomes possible to cause the PC or the like to function as the piping length calculating apparatus 20.

The distribution method for such a piping length calculating program is arbitrary, and the program may be distributed by being stored in a computer-readable recording medium such as a Compact Disc Read-Only Memory (CD-ROM), a Digital Versatile Disc (DVD), a Magneto Optical Disc (MO), or a memory card, or distributed via a communication network such as the Internet.

In this case, in cases such as where the function that executes the piping length calculation processing discussed above is realized by the distributed or cooperative action of an Operating System (OS) and an application program, only the application program portion may be stored in a recording medium or the like.

Various embodiments and modifications are available to the present invention without departing from the broad sense of spirit and scope of the present invention. The above-described embodiments are given for explaining the present invention and do not confine the scope of the present invention. In other words, the scope of the present invention is set forth by the scope of claims, not by the embodiments. Various modifications made within the scope of claims and scope of significance of the invention equivalent thereto are considered to fall under the scope of the present invention.

INDUSTRIAL APPLICABILITY

The present invention is preferably applied to the measurement of the refrigerant piping length in an air conditioner.

REFERENCE SIGNS LIST

1 Piping length measuring system
10 Frequency characteristics measuring apparatus
11a, 11b Terminal
20 Piping length calculating apparatus
30a, 30b Filter
40 Interface cable
50 Outdoor unit
60, 60a, 60b Indoor unit
70, 80 Refrigerant piping
71 Gas piping
72 Liquid piping
200 Interface
201 Auxiliary storage
202 Display
203 Inputter
204 Controller

The invention claimed is:

1. A piping length measuring system, comprising:
a frequency characteristics measuring apparatus;
a piping length calculating apparatus communicatively connected to the frequency characteristics measuring apparatus via a predetermined communication interface; and
a filter, wherein
the frequency characteristics measuring apparatus outputs a test signal at different frequencies from one end portion of refrigerant piping connecting an outdoor unit and an indoor unit of an air conditioner, measures frequency characteristics of the refrigerant piping by measuring at the end portion reflected signal levels at the different frequencies, and transmits the frequency characteristics measured to the piping length calculating apparatus,
the filter, attached between a measuring site on the refrigerant piping measured by the frequency characteristics measuring apparatus and the outdoor unit or the indoor unit nearest to the measuring site, prevents a test signal from flowing into the outdoor unit or the indoor unit during the measuring, and
the piping length calculating apparatus comprises a controller that extracts a lowest anti-resonant frequency from the frequency characteristics measured by the frequency characteristics measuring apparatus, and calculates a length of the refrigerant piping on the basis of the extracted lowest anti-resonant frequency.

2. The piping length measuring system according to claim 1, wherein
the piping length calculating apparatus extracts a plurality of anti-resonant frequencies under a given condition from the frequency characteristics measured by the frequency characteristics measuring apparatus, determines whether or not a branching exists in the refrigerant piping on the basis of the extracted plurality of anti-resonant frequencies, and in the case of determining that the branching does not exist, calculates a length of the refrigerant piping on the basis of the lowest anti-resonant frequency, whereas, in the case of determining that the branching does exist, selects anti-resonant frequencies that are not the lowest anti-resonant frequency and do not correspond to harmonic components from among the extracted plurality of anti-resonant frequencies, and calculates a length of the refrigerant piping on the basis of the selected anti-resonant frequencies.

3. The piping length measuring system according to claim 2, wherein
the piping length calculating apparatus determines that branching does not exist in the refrigerant piping in the case where the extracted anti-resonant frequencies other than the lowest anti-resonant frequency correspond to harmonic components of the lowest anti-resonant frequency.

4. The piping length measuring system according to claim 2, wherein
in the case of determining that branching does exist in the refrigerant piping, the piping length calculating apparatus calculates lengths respectively corresponding to anti-resonant frequencies that are not the lowest anti-resonant frequency and do not correspond to harmonic components to total the respective lengths, thereby calculating the length of the refrigerant piping.

5. The piping length measuring system according to claim 1, wherein
the measuring site on the refrigerant piping measured by the frequency characteristics measuring apparatus at the end portion of the refrigerant piping, the end of which is connected to the outdoor unit.

6. The piping length measuring system according to claim 1, wherein
the filter comprises a ferrite core.

7. The piping length measuring system according to claim 1, wherein
the frequency characteristics indicate the ratio of a signal level of the test signal output to the refrigerant piping by the frequency characteristics measuring apparatus to a signal level measured by the frequency characteristics measuring apparatus.

8. The piping length measuring system according to claim 1, wherein
the frequency characteristics indicate peak values of the voltage on the refrigerant piping measured by the frequency characteristics measuring apparatus.

9. The piping length measuring system according to claim 1, wherein
the frequency characteristics indicate effective values of the voltage on the refrigerant piping measured by the frequency characteristics measuring apparatus.

10. The piping length measuring system according to claim 1, wherein
the piping length calculating apparatus further comprises a display to display the calculated length of the refrigerant piping.

11. A piping length calculating apparatus comprising:
an interface that communicates with a frequency characteristics measuring apparatus that outputs a test signal at different frequencies from one end portion of refrigerant piping connecting an outdoor unit and an indoor unit of an air conditioner and measures frequency characteristics of the refrigerant piping by measuring at the end portion reflected signal levels at the different frequencies;
a controller that extracts a plurality of anti-resonant frequencies under a given condition from the frequency characteristics measured by the frequency characteristics measuring apparatus, determines whether or not a branching exists in the refrigerant piping on the basis of the extracted plurality of anti-resonant frequencies, and in the case of determining that the branching does not exist, calculates a length of the refrigerant piping on the basis of a lowest anti-resonant frequency from among the extracted plurality of anti-resonant frequencies, whereas, in the case of determining that the branching does exist, selects anti-resonant frequencies that are not the lowest anti-resonant frequency and do not correspond to harmonic components from among the extracted plurality of anti-resonant frequencies, and calculates a length of the refrigerant piping on the basis of the selected anti-resonant frequencies; and
a display that displays the calculated length of the refrigerant piping.

12. A non-transitory computer readable recording medium having stored thereon a program causing a computer including a controller and an interface that communicates with a frequency characteristics measuring apparatus that outputs a test signal at different frequencies from one end portion of refrigerant piping connecting an outdoor unit and an indoor unit of an air conditioner and measures frequency characteristics of the refrigerant piping by measuring at the end portion reflected signal levels at the different frequencies to realize the functions of:
extracting a plurality of anti-resonant frequencies under a given condition from the frequency characteristics measured by the frequency characteristics measuring apparatus, determining whether or not a branching exists in the refrigerant piping on the basis of the extracted plurality of anti-resonant frequencies, and in the case of determining that the branching does not exist, calculating a length of the refrigerant piping on the basis of a lowest anti-resonant frequency from among the extracted plurality of anti-resonant frequencies, whereas, in the case of determining that the branching does exist, selecting anti-resonant frequencies that are not the minimum anti-resonant frequency and do not correspond to harmonic components from among the extracted plurality of anti-resonant frequencies, and calculating a length of the refrigerant piping on the basis of the selected anti-resonant frequencies; and displaying the calculated length of the refrigerant piping on a display.

13. A method for calculating a length of a piping, the method comprising:
outputting, by a frequency characteristics measuring apparatus, a test signal at different frequencies from one end portion of refrigerant piping connecting an outdoor unit and an indoor unit of an air conditioner, measuring, by the frequency characteristics measuring apparatus, frequency characteristics of the refrigerant piping by measuring at the end portion reflected signal levels at the different frequencies, and transmitting, by the frequency characteristics measuring apparatus, the frequency measured to the piping length calculating apparatus, and
extracting, by the piping length calculating apparatus, a plurality of anti-resonant frequencies under a given condition from the frequency characteristics received, determining, by the piping length calculating apparatus, whether or not a branching exists in the refrigerant piping on the basis of the extracted plurality of anti-resonant frequencies, and in the case of determining that the branching does not exist, calculating, by the piping length calculating apparatus, a length of the refrigerant piping on the basis of a lowest anti-resonant frequency from among the extracted plurality of anti-resonant frequencies, whereas, in the case of determining that branching does exist, selecting, by the piping length calculating apparatus, anti-resonant frequencies that are not the lowest anti-resonant frequency and do not correspond to harmonic components from among the extracted plurality of anti-resonant frequencies, calculating, by the piping length calculating apparatus, a length of the refrigerant piping on the basis of the selected anti-resonant frequencies and displaying on a display, by the piping length calculating apparatus, the calculated length of the refrigerant piping.

* * * * *